(12) United States Patent
Feinberg

(10) Patent No.: US 6,798,745 B1
(45) Date of Patent: Sep. 28, 2004

(54) QUALITY OF SERVICE MANAGEMENT FOR VOICE OVER PACKET NETWORKS

(75) Inventor: Brion N Feinberg, Morganville, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 831 days.

(21) Appl. No.: 09/595,350

(22) Filed: Jun. 15, 2000

(51) Int. Cl.[7] .............................................. H04L 12/56
(52) U.S. Cl. ..................... 370/235; 370/252; 370/352; 370/395.2
(58) Field of Search ............................. 370/230, 230.1, 370/231, 235, 252, 253, 352, 389, 395.1, 395.2, 395.21, 395.5, 395.51, 395.52, 401

(56) References Cited

U.S. PATENT DOCUMENTS

| | | | | |
|---|---|---|---|---|
| 5,408,465 A | * | 4/1995 | Gusella et al. .............. 370/231 |
| 5,898,668 A | * | 4/1999 | Shaffer ........................ 370/230 |
| 6,097,699 A | * | 8/2000 | Chen et al. .................. 370/231 |
| 6,134,589 A | * | 10/2000 | Hultgren ..................... 709/227 |
| 6,212,562 B1 | * | 4/2001 | Huang ......................... 709/227 |
| 6,629,126 B1 | * | 9/2003 | Schantz et al. ............. 709/201 |

* cited by examiner

Primary Examiner—Alpus H. Hsu
(74) Attorney, Agent, or Firm—Matthew J. Hodulik

(57) ABSTRACT

A Quality of Service (QoS) provision for voice and other delay sensitive call connections established over the Internet and other packet-based networks is achieved by generating a QoS performance parameter value corresponding to the performance of one or more packet-based call connections utilizing common packet network resources, comparing the QoS performance parameter value to an acceptable range of QoS values, and terminating one or more call connections utilizing common packet network resources if the QoS performance parameter value does not fall within the acceptable range of QoS values.

21 Claims, 3 Drawing Sheets

QUALITY OF SERVICE MANAGEMENT FOR VOICE OVER PACKET NETWORKS

FIELD OF THE INVENTION

The present invention relates quality of service (QoS) management of call connections over packet-based networks.

BACKGROUND OF THE INVENTION

A global network infrastructure for voice services, using a circuit-switching methodology, is supported by Public Switched Telephone and Private Branch Exchange networks. These networks utilize signaling to establish call connections and routing maps at network switches. The ability to signal during call connection set-up provides individual switches with the capability to reject call connection requests when that individual switch can not dedicate the available bandwidth to support a new call connection. Since any switch in a connection path may reject a new call connection request based on available bandwidth limitations, switched voice networks are able to provide guaranteed Quality of Service to established connections. Quality of Service in switched voice networks is guaranteed because the governing precept is that it is preferable to block new call connection attempts rather than allow a new connected call to degrade the performance of established connected calls.

Explosive growth in Internet Protocol (IP) based intranets and the public Internet has generated a large network infrastructure of IP based routers. Recently, this large IP network infrastructure has begun to be utilized as a vehicle for real-time transmission of voice over the Internet, also known as Internet telephony. Each year, Internet telephony captures a greater share of the telephony market. However, unlike the case of switched voice service networks, bandwidth over packet-based networks is not reserved for the real-time transmission of packets, and therefore these networks are subject to the vagaries of packet loss, packet delay, packet arrival out of sequence, and jitter; each of which is a disadvantage when compared to circuit-switched connections established over the Public Switched Telephone Networks and Private Branch Exchanges. Rather, transmission over the Internet and other IP networks is often accomplished via a best effort transmission mode. Even when systems are used to reserve or allocate bandwidth within IP networks, these systems are not foolproof and certain conditions can lead to inadequate bandwidth. Consequently, telephony over IP networks does not currently provide a Quality of Service guarantee for voice and other delay sensitive transmissions.

SUMMARY OF THE INVENTION

A Quality of Service (QoS) provision for voice and other delay sensitive call connections established over the Internet and other packet-based networks is achieved by generating a QoS performance parameter value corresponding to the performance of one or more packet-based call connections utilizing common packet network resources, comparing the QoS performance parameter value to an acceptable range of QoS values, and terminating one or more call connections utilizing common packet network resources if the QoS performance parameter value does not fall within the acceptable range of QoS values. The invention leverages the recognition that it is preferable to terminate one or more established call connections to preserve the quality of the remaining call connections, rather than to allow the degradation in the Quality of Service provided to all of the connected calls utilizing common packet network resources.

BRIEF DESCRIPTION OF THE DRAWINGS

A more complete understanding of the present invention may be obtained from consideration of the following description in conjunction with the drawings in which.

DETAILED DESCRIPTION

| LIST OF ACRONYMS | |
|---|---|
| ATM | Asynchronous Transfer Mode |
| DSP | Digital Signal Processor |
| IP | Internet Protocol |
| ISDN | Integrated Services Digital Network |
| PCM | Pulse Code Modulation |
| PRI ISDN | Primary Rate Interface, Integrated Services Digital Network |
| PSTN | Public Switched Telephone Network |
| QoS | Quality of Service |
| RTP | Real Time Protocol |
| SS7 | Signaling System 7 |
| SIP | Simple Internet Protocol |
| VoIP | Voice over Internet Protocol |
| VoP | Voice over Packet |

Figure 1:
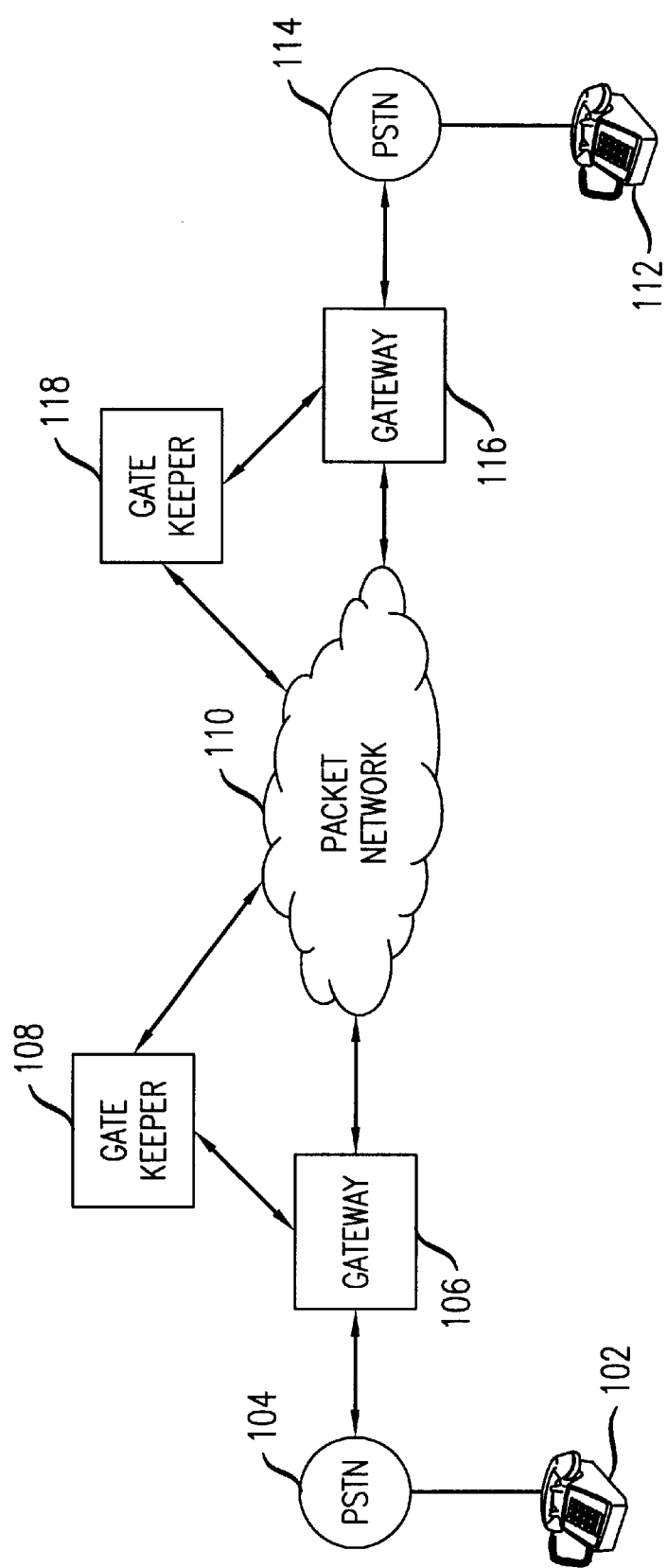
FIG. 1 illustrates an exemplary network architecture for conveyance of voice over a packet network, and to which the principles of the present invention may be applied.

Referring to FIG. 1, there is shown an exemplary network architecture for conveyance of voice over a packet network 110, and to which the principles of the present invention may be applied. For the purposes of the instant description, assume that a user of phone 102 wishes to establish a call connection with phone 112. A Public Switched Telephone Network (PSTN) switch 104, servicing the subscribing user, is utilized to establish a circuit-switched connection from phone 102 to Gateway 106. Similarly, at the call-terminating end, a PSTN switch 114 is used to establish a circuit-switched connection from phone 112 to Gateway 116. In addition to traditional gateway functionality, Gateways utilized in conjunction with voice over packet transport have additional functionality and capability for packetizing the circuit-switched signal received from the PSTN switch, and thus enabling transport over the packet network 110, whether that network is an IP network, FR (Frame Relay) network, ATM network, or any other packet-based network. If the circuit-switched voice connection received at the Gateway 106 for transport over the packet network 110 is analog, then the Gateway 106 also performs an analog to digital (A/D) conversion of the analog signal to allow for packetization of the digitized signal (conversely, D/A conversion at the terminating end).

Gatekeepers 108,118 function to provide terminal and gateway registration, address resolution, bandwidth control and other well-known network administration functions. Typically, Gatekeepers 108,118 message and signal via a packet network 110, here illustrated as the same packet network 110 over which the call connection between phone 102 and phone 112 is to be completed. Although not shown in the instant illustration, it is also recognized that messaging and signaling between Gatekeepers 108,118 may be provided over a network separate and distinct from the packet network 110 used to convey the call itself. Therefore, in an exemplary embodiment of the present invention, messaging and signaling between Gatekeepers is provided over an X.25 network, while a voice call is transported, at least for a portion of its call connection path, as a voice over Internet (also known as a voice over IP, or VoIP) call. Such an example is presented as merely illustrative, and the present invention is not to be construed as being so limited, since it is a matter of design choice as to whether one or more packet networks are utilized. Similarly, although the packet network 110 over which a voice call is conveyed is sometimes described as being the Internet or other IP network for illustrative purposes, the present invention applies equally as well when utilized in conjunction with any packet-based network.

A description of the steps involved in establishing a voice over packet (VoP) call connection using the network and devices shown in FIG. 1 follows. Phone 102 goes off-hook and the subscribing user enters the telephone number corresponding to phone 112. PSTN switch 104 receives the entered telephone number, creates a Q.931 call setup message, and conveys the call setup message to the servicing Gateway 106. Q.931 is a well-known message-oriented signaling protocol for the Primary Rate Interface (PRI) Integrated Services Digital Network (ISDN) D-channel. The protocol describes the signaling and messaging type and content, and provides for call setup and tear down, called party number and information, bearer capability, status checking, integration of voice and circuit-switched data traffic, to name but a few Q.931 functions. Although Q.931 is used in conjunction with an ISDN channel, it would also be apparent to those skilled in the art that other signaling and messaging schemes and protocols may be used, and therefore the present invention is not limited to a single embodiment in which the Q.931 protocol is used. For example, one such alternative embodiment is utilized in conjunction with a network supported by the well-known Signaling System 7 (SS7). In network using SS7, the PSTN switch 104 conveys messaging and signaling over the SS7 packet network (not shown) to the Gatekeeper 108, without first being directed to the servicing Gateway 106.

Returning now to the description of an embodiment incorporating a PRI ISDN interface between the PSTN switches 104,114 and their respective Gateways 106,116, once the Q.931 call setup message is received at the originating Gateway 106, the Gateway 106 launches the call setup message to the originating Gatekeeper 108, typically utilizing H.323 or Simple Internet Protocol (SIP), by way of example, although not to be construed as being limited to these protocols. The originating Gatekeeper 108 queries its inter-zone table to locate a terminating Gatekeeper 118 servicing the terminating PSTN switch 114 which in turn services the destination phone 112 to which the call connection is to be completed. The originating Gatekeeper 108, via either the Internet or a separate signaling and messaging network, launches the call setup message to the terminating Gatekeeper 118. The terminating Gatekeeper 118, upon receipt of the call setup message, queries its intra-zone routing table to determine call setup routing. In some implementations, the terminating Gatekeeper 118 and originating Gatekeeper 108 negotiate to insure reasonable probability of adequate QoS across packet network 110. The terminating Gatekeeper 118 then forwards the call setup message to the terminating Gateway 116. The terminating Gateway 116 formulates a Q.931 call setup message and forwards that message to the terminating PSTN switch 114. At this point, the call, setup message has been conveyed from end to end. The terminating PSTN switch 114 responds by returning an Alert message followed by a Connect message back to the terminating Gateway 116. The terminating Gateway 116 conveys these messages back to the originating Gateway 106 via the terminating Gatekeeper 118, packet network 110, and originating Gatekeeper 108. Originating Gatekeeper 108 then allows call admission and the call is commenced end to end with an established media stream between originating and terminating Gateways 106, 116. The terminating Gateway 116, upon receiving VoP packets from the originating Gateway 106, resequences the received packets, decodes the information in the packets received to recreate the pulse code modulated (PCM) or analog signal, and launches the signal over the circuit-switched connection with PSTN switch 114 for delivery to the destination phone 112.

In addition to the above-described functionalities, Gateways may be equipped to monitor and evaluate Quality of Service (QoS) performance. The character and type of QoS parameters monitored depend upon the type of packet network and the protocols utilized. As an illustrative rather than exhaustive example, monitored QoS parameters may include (i) packet loss, (ii) packets received out of sequence, (iii) excessive network delay (delay), and (iv) excessive time between received packets (jitter), just to name a few. By way of specific example, one such well-known QoS parameter utilized in conjunction with Real Time Protocol (RTP) transport is packets received out of sequence. Packets transported utilizing RTP include a sequencing number included in the packet payload, and therefore may be resequenced at the terminating point, regardless of the order in which the packets were received. Packets received out of sequece indicate lost packets or excessive delay.

Figure 2:
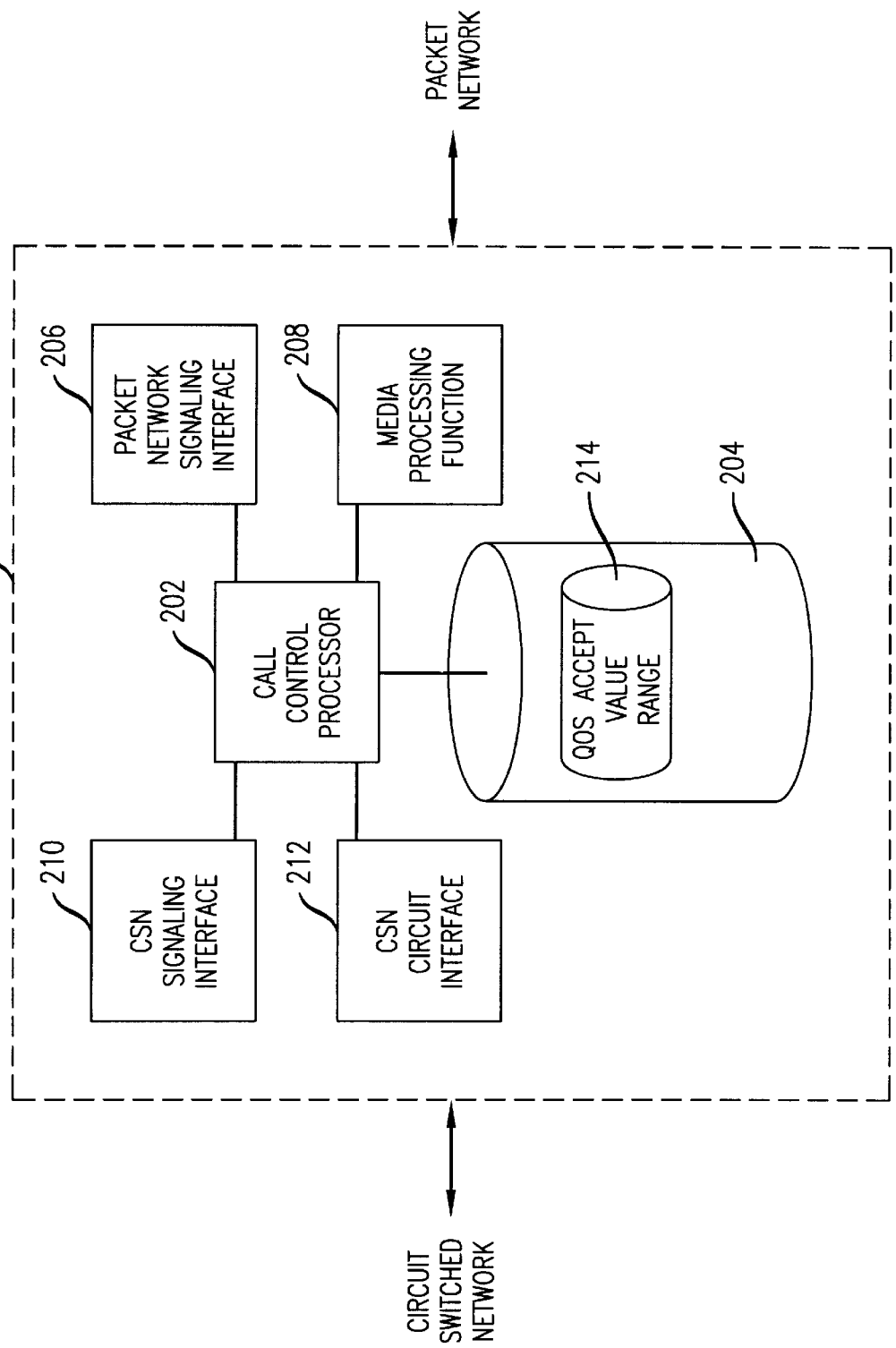
FIG. 2 illustrates the high level architecture of a gateway used to implement the principles of the present invention in one exemplary embodiment.

FIG. 2 illustrates one exemplary embodiment for the gateway architecture used to implement the principles of the present invention. A gateway 200 is comprised of a call control processor 202, a data storage device 204, a packet network signaling interface 206, a media processor 208, a circuit-switched network signaling interface 210, and a circuit-switched network circuit interface 212. The circuit-switched network circuit interface 212 provides Gateway 200 access to the circuit-switched network for circuit-switched voice and other channel connections, such as a T-1 or other well-known links. The circuit-switched network signaling interface 210 provides a Gateway 200 interface for circuit-switched signaling, such as an ISDN signaling interface. Alternate embodiments of the present invention, applicable for example when used in conjunction with a circuit-switched network using the SS7 signaling system, may have the circuit-switched signaling interface 210 functionality resident at the Gatekeeper instead of the Gateway. The call control processor 202 performs all call control processing function for the Gateway 200, including, but not limited to, processing the signaling information, establishing the media stream, and other call processing functions. It would be understood by those skilled in the art that the call control processor 202 may reside in a single processor, or that the processing functionality may be distributed amongst a plurality of processing devices. The call control processor performs its functions in conjunction with instructions and data stored in the data storage device 204. The packet network signaling interface 206 provides packet network bearer information, such as call setup and call tear down information, to the call control processor 202. For example, signaling exchanged between the Gateway 200 and the Gatekeeper typically utilizes the packet network signaling interface 206. The media processor 208 is typically incorporated within a digital signal processor (DSP), although that functionality may alternatively be incorporated as an auxiliary function of the call control processor 202 in conjunction with the data storage device 204. One exemplary function of the media processor 208 is to provide for signal conversion between the packet and circuit-switched networks. The media processor 208 is tasked with constructing packets from the analog or PCM signal received from the originating PSTN switch when acting as the originating Gateway, or alternatively, constructing an analog or PCM signal for delivery to the terminating PSTN switch when acting as the terminating Gateway. A QoS acceptance value range (AVR) field 214 is maintained by the data storage device 204. The QoS AVR field 214 contains the acceptable limits and threshold values for aforementioned monitored QoS parameters. Actual transport values that fall outside of the QoS acceptable limits and values are indicative of a discernible degradation in network performance in transporting the VoP stream. The QoS acceptance value range field 214 illustratively may include limitations governing (i) number of packets lost, (ii) number of packets received out of sequence, (iii) excessive network delay (delay), and (iv) excessive time between received packets (jitter), to name just a few.

Figure 3:
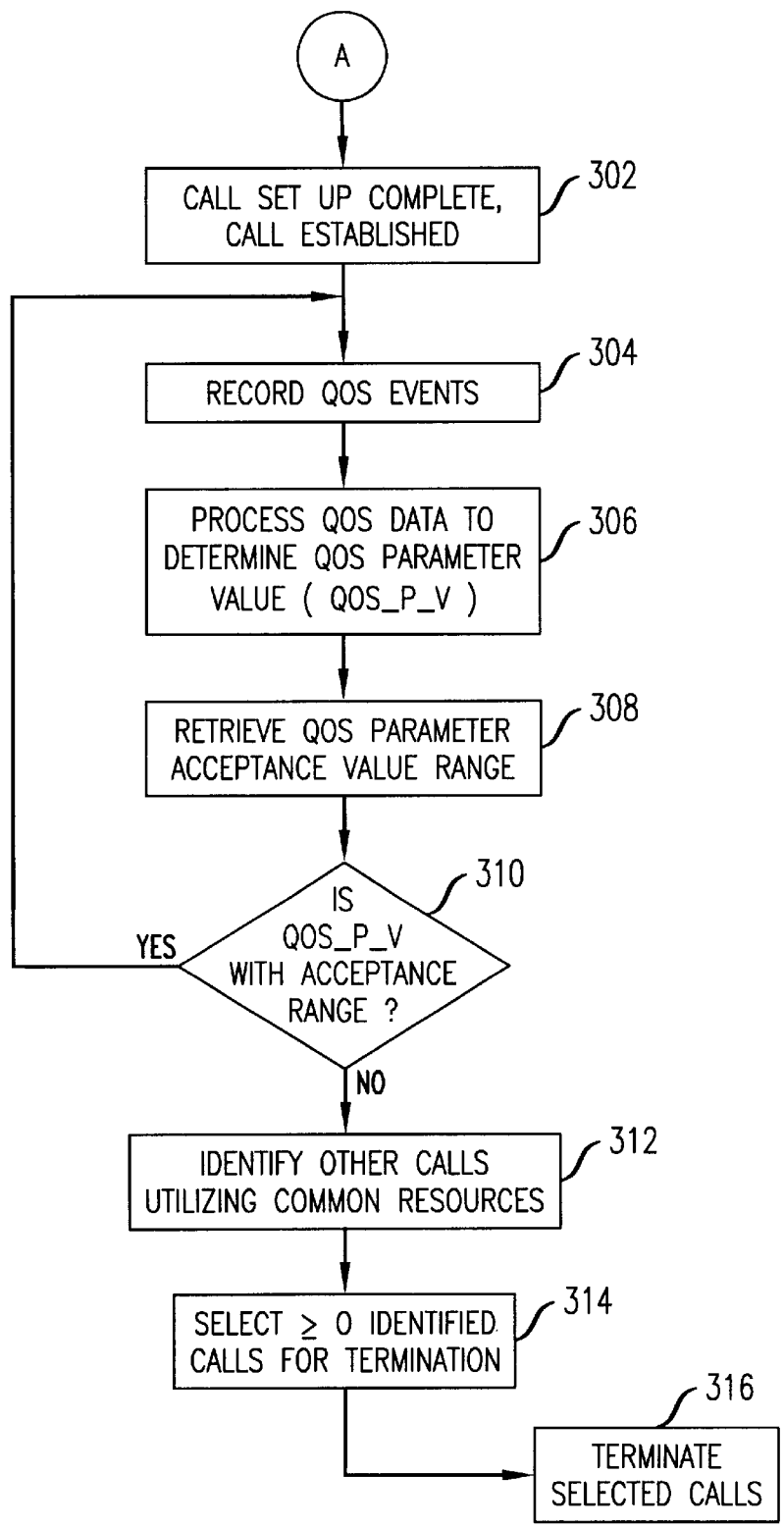
FIG. 3 is a flow diagram of the process steps performed in an exemplary embodiment of the present invention.

FIG. 3 is a flow diagram of the process steps performed in an exemplary embodiment of the present invention. Assume that the previously described VoP Gateway 106 to Gateway 116 call setup is complete (302). Once the call is established, the Gateway 106,116 (originating, terminating, or both) monitors QoS performance parameter data and stores the data as QoS events records (304). Stored QoS events are processed to obtain a QoS parameter value (306). As previously mentioned, the stored QoS events may be of any number of performance-indicating types, including but not limited to, packet loss, packets received out of sequence, network delay, jitter, or other performance data. Additionally, it would be understood by those skilled in the art that the number of combinations and permutations for processing or shaping the raw data which comprises the QoS events to obtain QoS parameter values is nearly unlimited, and is merely a matter of design choice and system capabilities. However, by way of example and not limitation, in one specific embodiment of the present invention in which the defined QoS event is packet loss, a QoS parameter value is produced by summing the total number of lost packets in a one second period. The applicable QoS acceptance value range (AVR) field 214 maintained in the data storage device 204 is dipped to obtain the QoS acceptance value (308). The QoS acceptance value represents the acceptable limits (range or threshold) associated with the specified QoS parameter value. The QoS parameter value is next compared to the QoS acceptance value (310). If the QoS parameter value is within the acceptable range then no corrective action is taken, and in one particular embodiment of the invention illustrated in accordance with FIG. 3, the QoS performance parameter data is persistently and asynchronously monitored.

If however, the QoS parameter value falls outside of the QoS acceptance range or beyond the threshold QoS acceptance value, then the possibility of corrective action via the termination of connected calls is explored. This type of radical corrective action is explored because established QoS criteria, for at least one connected call, is not being met. Therefore, in accordance with the principles of the present invention, tear down or termination of established connected calls may be warranted in order to preserve the QoS for the remaining call connections utilizing common resources. In one embodiment of the present invention, connected calls utilizing common resources are first identified (312). As an illustrative example, all connected calls established between a common pair of gateways, or alternatively all calls utilizing a common router, links or router queue, may be identified. Of the group of connected calls identified as utilizing a common resource or resources, a subset of one or more calls are selected for termination (314). Calls that are selected, by whatever means used for the selection process, are then terminated (316). In some implementations, it may also be desirable for the gateway to exchange information with a gatekeeper to determine eligible calls for termination.

One such method for selecting VoP network calls for termination when the call connection QoS criteria is not met, is to apply an iterative probabilistic algorithm to all the calls sharing the common resource(s), although the principles of the present invention apply equally, regardless of the particular selection scheme utilized. Referring again to FIG. 1, suppose a call is established between an originating phone 102 and destination phone 112. A portion of the connection is conveyed over the packet network 110, between Gateway 106 and Gateway 116. Further, suppose that a monitored QoS parameter value for a connected call exceeds a packet network 110 QoS threshold value or falls outside of a QoS acceptance range (for purposes of the instant example, assume that the QoS parameter considered is packet loss between gateways 106,116). Thus, the instant embodiment of the present invention removes a fraction of the voice generated load when packet loss is detected. The voice load is removed by the packet network 110 Gateways 106,116 acting to disconnect established voice connections, and then subsequently acting to limit new attempts to establish a call connection over common network resources.

Let L(T) be the rate of packet loss during the time interval T. Therefore, packet loss must fall within the fractional limitations described by:

$$0 \leq L(T) \leq 1,$$

with L(T)=0 being no detected packet loss, and L(T)=1 being complete loss of all packets. Then, let R(L(T)) represent a function of L(T), a function corresponding to the desired rate of load reduction that we wish to achieve when we observe a packet loss rate of L(T). For example, if there is no packet loss (L(T)=0), then voice load over packet network 110 need not be reduced and neither Gateway 106 nor Gateway 116 need terminate or tear down an existing call connection. However, as L(T) becomes increasingly greater in value (L(T)>0) QoS begins to degrade and either Gateway 106,116 terminates existing call connections. The number of terminations of existing call connections is determined in accordance with the severity of the packet loss rate (L(T)).

In one embodiment of the present invention, calls are selected for termination through random selection from among those calls identified as utilizing common resources within the packet network 110. Those skilled in the art would also realize that other termination schemes may also be successfully utilized. One such alternative termination scheme favors termination of recently established call connections; that is, the most recently established call connection is the first to be terminated when a termination is required, the next most recently established call connection is next to be terminated, and so on, until the requisite VoP load reduction is achieved. Another alternative termination scheme, distinguishes calls based on their class of service and, for example, disconnects calls in the lowest priority class first. Yet another alternative termination scheme favors preservation of recently established call connections; that is, the longest established call connection is the first to be terminated when a termination is required, the next longest established call connection is next to be terminated, and so on, until the requisite VoP load reduction is achieved. Additionally, although one embodiment of the present invention utilizes conventional tear down of a VoP connection to effectuate a call termination, other methods for call termination may also be used, including in a most extreme case, dropping a call or calls with no tear down messaging or signaling at all between Gatekeepers 108,118. In a less extreme alternative embodiment, a gatekeeper tears down the requisite number of call connections, and rejects future call connection requests between gateways for a specified time interval. Alternatively, rather than disconnecting the call, the gateway reroutes the call to an announcement platform or peripheral that plays an announcement such as "Please hold on—your call will be reestablished shortly".

The foregoing description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various illustrated or described elements, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method for maintaining quality of service (QoS) for a plurality of call connections utilizing common resources within a packet network, said method comprising the steps of:

generating a QoS performance parameter value corresponding to the performance of at least one of said plurality of call connections;

comparing said QoS performance parameter value to a range of acceptable QoS values; and if said QoS performance parameter value is not included within said range of acceptable QoS values, then selecting a subset of said plurality of call connections for termination;

wherein said generating step further comprises the substeps of:

monitoring a QoS parameter associated with said at least one of said plurality of call connections;

periodically quantifying a monitored value for said QoS parameter;

storing a plurality of said periodically quantified monitored values to form a QoS event record; and calculating said QoS performance parameter value, wherein said QoS performance parameter value is determined as a function of the values contained within said QoS event record.

2. The method in accordance with claim 1 further comprising the step of:

terminating call connections selected from said subset of said plurality of call connections selected for termination.

3. The method in accordance with claim 2 wherein said step of terminating is accomplished using call connection tear down signaling to notify said common resources of said packet network that said subset of said plurality of call connections will be terminated.

4. The method in accordance with claim 2 wherein said step of terminating is accomplished by dropping said call connections at a gateway to said packet network without first launching a signal from said gateway that said subset of said plurality of call connections will be terminated.

5. The method in accordance with claim 2 wherein said step of terminating is accomplished by transferring an originating party and a destination party of ones of said subset of said plurality of call connections selected for termination to an announcement platform until said common resources of said packet network can again support maintenance of said quality of service.

6. The method in accordance with claim 1 wherein said packet network is an Internet Protocol based network.

7. The method in accordance with claim 6 wherein said Internet Protocol based network is the Internet.

8. The method in accordance with claim 1 wherein said packet network is an ATM based network.

9. The method in accordance with claim 1 wherein said network is a Frame Relay network.

10. The method in accordance with claim 1 wherein said QoS performance parameter value is a value corresponding to the packet loss of said at least one of said plurality of call connections.

11. The method in accordance with claim 1 wherein said QoS performance parameter value is a value corresponding packets received out of sequence for said at least one of said plurality of call connections.

12. The method in accordance with claim 1 wherein said QoS performance parameter value is a value corresponding to packet delay associated with said at least one of said plurality of call connections.

13. The method in accordance with claim 1 wherein said QoS performance parameter value is a value corresponding to the jitter associated with said at least one of said plurality of call connections.

14. The method in accordance with claim 1 wherein said plurality of call connections are voice call connections.

15. The method in accordance with claim 1 wherein said selecting step randomly selects individual ones of said plurality of call connections utilizing common resources to form said subset of said plurality of call connections for termination.

16. The method in accordance with claim 1 wherein said selecting step preferentially weights most recently established call connections, from amongst said plurality of call connections utilizing common resources, to form said subset of said plurality of call connections for termination.

17. The method in accordance with claim 1 wherein said selecting step preferentially weights longest established call connections, from amongst said plurality of call connections utilizing common resources, to form said subset of said plurality of call connections for termination.

18. The method in accordance with claim 1 wherein said selecting step preferentially weights call connections based on different levels of service, from amongst said plurality of call connections utilizing common resources, to form said subset of said plurality of call connections for termination.

19. A device for maintaining quality of service (QoS) for a plurality of call connections utilizing common resources within a packet network, said device comprising:
   means for generating a QoS performance parameter value corresponding to the performance of at least one of said plurality of call connections;
   means for comparing said QoS performance parameter value to a range of acceptable QoS values; and
   means for selecting a subset of said plurality of call connections for termination, should said QoS performance parameter value fall outside of said range of acceptable QoS values;
   wherein said means for generating further comprises:
   means for monitoring a QoS parameter associated with said at least one of said plurality of call connections;
   means for periodically quantifying a monitored value for said QoS parameter;
   means for storing a plurality of said periodically quantified monitored values to form a QoS event record; and
   means for calculating said QoS performance parameter value, wherein said QoS performance parameter value is determined as a function of the values contained within said QoS event record.

20. A packet network gateway for maintaining quality of service (QoS) for a plurality of call connections utilizing common resources within a packet network, said gateway comprising:
   a processor; and
   a storage device connected to said processor and including instructions for controlling said processor, said processor operative with said instructions to;
   generate a QoS performance parameter value corresponding to the performance of at least one of said plurality of call connections;
   compare said QoS performance parameter value to a range of acceptable QoS values; and
   select a subset of said plurality of call connections for termination, should said QoS performance parameter value fall outside of said range of acceptable QoS values;
   wherein said generate step further comprises instructions to:
   monitor a QoS parameter associated with said at least one of said plurality of call connections;
   periodically quantify a monitored value for said QoS parameter;
   store a plurality of said periodically quantified monitored values to form a QoS event record; and
   calculate said QoS performance parameter value, wherein said QoS performance parameter value is determined as a function of the values contained within said QoS event record.

21. A method for maintaining quality of service (QoS) for a plurality of call connections utilizing common resources within a packet network, said method comprising the steps of:
   monitoring a QoS parameter associated with at least one of said plurality of call connections;
   periodically quantifying a monitored value for said QoS parameter;
   storing a plurality of said periodically quantified monitored values to form a QoS event record; and
   calculating a QoS performance parameter value, wherein said QoS performance parameter value is determined as a function of the values contained within said QoS event record,
   comparing said QoS performance parameter value to a range of acceptable QoS values;
   selecting a subset of said plurality of call connections for termination, should said QoS performance parameter value fall outside of said range of acceptable QoS values.

* * * * *